(12) United States Patent
Chiu et al.

(10) Patent No.: US 9,338,809 B2
(45) Date of Patent: May 10, 2016

(54) SYSTEM FOR COUPLING MOBILE DEVICE TO HOST COMPUTER OF AUTOMOBILE AND METHOD THEREOF

(71) Applicant: HON HAI PRECISION INDUSTRY CO., LTD., New Taipei (TW)

(72) Inventors: Liang-Te Chiu, New Taipei (TW); Chia-Hao Kang, New Taipei (TW); Hsin-Wei Huang, New Taipei (TW); Sheng-Feng Weng, New Taipei (TW); Bing-Ju Tu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/552,136

(22) Filed: Nov. 24, 2014

(65) Prior Publication Data
US 2016/0105922 A1    Apr. 14, 2016

(30) Foreign Application Priority Data

Oct. 8, 2014   (TW) .............................. 103134963 A

(51) Int. Cl.
*H04W 76/02* (2009.01)
*H04L 29/08* (2006.01)
*H04W 4/00* (2009.01)

(52) U.S. Cl.
CPC ............. *H04W 76/023* (2013.01); *H04L 67/12* (2013.01); *H04W 4/008* (2013.01)

(58) Field of Classification Search
CPC ..... H04W 12/06; H04W 48/14; H04W 4/008; H04W 4/046
See application file for complete search history.

(56) References Cited

U.S. PATENT DOCUMENTS

| | | | | |
|---|---|---|---|---|
| 8,180,337 | B2 * | 5/2012 | Veliu | G07C 5/008 340/426.12 |
| 2010/0148920 | A1 * | 6/2010 | Philmon | H04M 1/67 340/5.2 |
| 2010/0324977 | A1 * | 12/2010 | Dragt | G06Q 30/0257 705/14.1 |
| 2011/0021213 | A1 * | 1/2011 | Carr | H04B 5/0031 455/456.4 |
| 2012/0071096 | A1 * | 3/2012 | Matsushita | H04M 1/6075 455/41.2 |
| 2013/0017816 | A1 | 1/2013 | Talty et al. | |
| 2013/0046592 | A1 * | 2/2013 | Ross | G06F 3/048 705/14.4 |
| 2013/0244635 | A1 | 9/2013 | Weiss | |
| 2015/0004911 | A1 * | 1/2015 | Schmidt | H04L 67/12 455/41.2 |
| 2015/0024688 | A1 * | 1/2015 | Hrabak | H04W 4/008 455/41.2 |

* cited by examiner

*Primary Examiner* — David Bilodeau
(74) *Attorney, Agent, or Firm* — Novak Druce Connolly Bove + Quigg LLP

(57) ABSTRACT

A method for coupling a mobile device with a host computer of a vehicle includes establishing a connection relationship between the mobile device and the host computer, sending an invitation to the mobile device according to the established connection relationship, and coupling the mobile device to the host computer after accepting the invitation. The invitation is sent by the host computer automatically after the host computer is turned on. The mobile device couples to the host computer automatically through a corresponding coupling mechanism after accepting the invitation.

10 Claims, 5 Drawing Sheets

SYSTEM FOR COUPLING MOBILE DEVICE TO HOST COMPUTER OF AUTOMOBILE AND METHOD THEREOF

FIELD

The present disclosure relates to automobile technologies, and particularly to a system for coupling a mobile device to a host computer of an automobile.

BACKGROUND

Commonly, mobile devices, such as mobile phones and tablets, can couple to a host computer of an automobile via BLUETOOTH.

BRIEF DESCRIPTION OF THE DRAWINGS

Implementations of the present technology will now be described, by way of example only, with reference to the attached figures.

DETAILED DESCRIPTION

Figure 1:
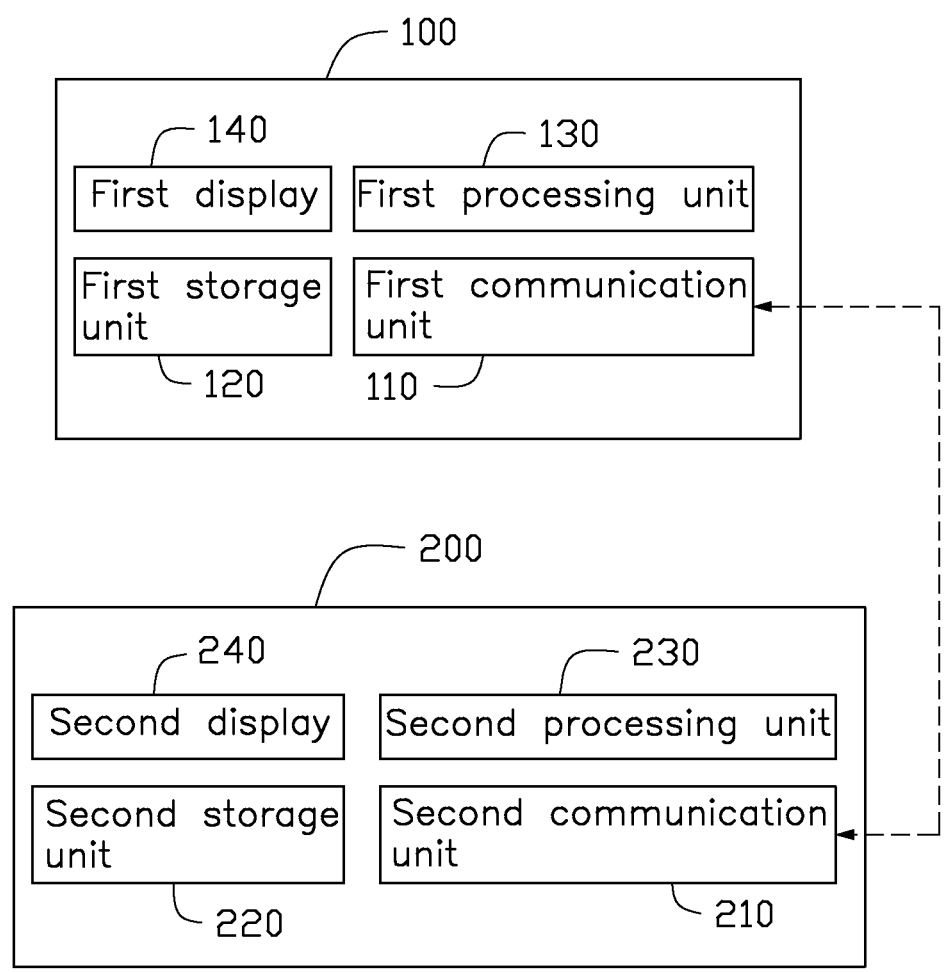
FIG. 1 is a diagrammatic view of an exemplary embodiment of a host computer and a mobile device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an exemplary embodiment of a system for coupling a mobile device 200 to a host computer 100 of a vehicle (not shown). After the host computer 100 is turned on, the host computer 100 can automatically send an invitation to the mobile device 200 to couple the mobile device 200 to the host computer 100. In at least one embodiment, a messaging method of sending the invitation can include an SMS messaging method, a cellular data messaging method, and any other suitable messaging method.

The host computer 100 can include a first communication unit 110, a first storage unit 120, a first processing unit 130, and a first display 140. The first communication unit 110 can send the invitation to the mobile device 200. The first display 140 can display a graphical user interface of the host computer 100 operable by a user.

The mobile device 200 can include a second communication unit 210, a second storage unit 220, a second processing unit 230, and a second display 240. The second communication unit 210 can receive the invitation sent from the first communication unit 110. The second display 240 can display a graphical user interface of the mobile device 100 operable by the user.

Figure 2:
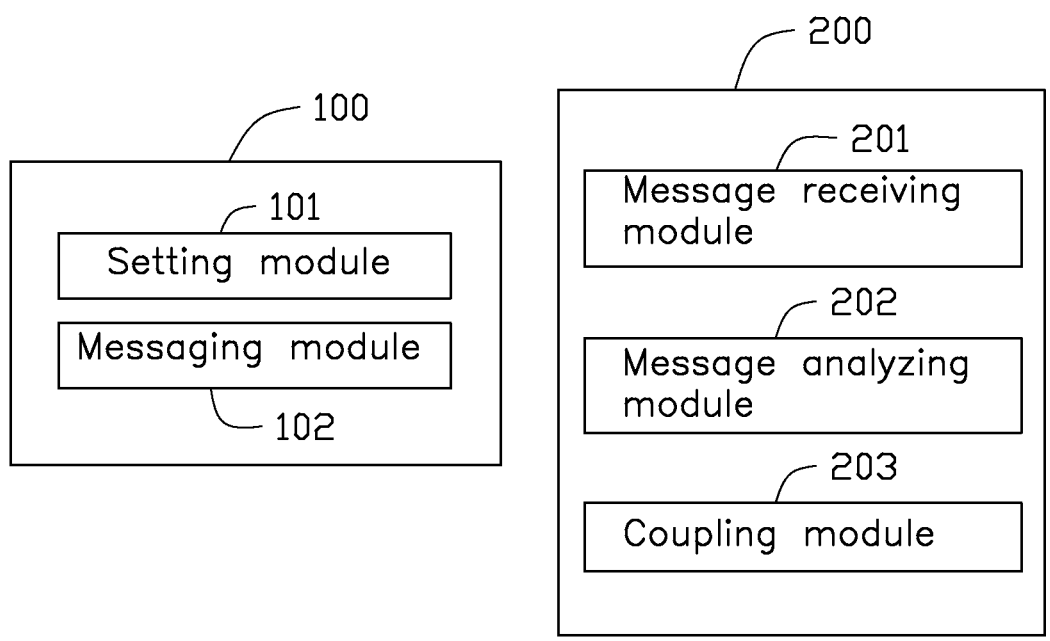
FIG. 2 is a diagrammatic view of an exemplary embodiment of function modules of the host computer and the mobile device of FIG. 1.

FIG. 2 illustrates an exemplary embodiment of a plurality of modules of the host computer 100 and the mobile device 200. The plurality of modules of the host computer 100 can include a setting module 101 and a messaging module 102. The modules 101-102 can include one or more software programs in the form of computerized codes stored in the first storage unit 120. The computerized codes can include instructions executed by the first processing unit 130 to provide functions for the modules 101-102.

The setting module 101 can establish a connection relationship between the host computer 100 and the mobile device 200. The connection relationship can be established by a user inputting information of the connection relationship. The information of the connection relationship can include the messaging method for sending the invitation to the mobile device 200, and identification information of the mobile device 200. For example, when the messaging method is the SMS messaging method, the identification information of the mobile device 200 can be an SMS number of the mobile device 200. When the messaging method is the cellular data messaging method, the identification of the mobile device 200 can be a user ID for an application used by the user of the mobile device, for example.

The messaging module 102 can identify the established connection relationship between the host computer 100 and the mobile device 200, determine the messaging method for sending the invitation to the mobile device 200 according to the established connection relationship, and send the message to the mobile device 200 through the first communication unit 110 according to the determined messaging method and the established connection relationship. In at least one embodiment, the first communication unit can send the invitation to the mobile device 200 automatically after the host computer 100 is turned on.

In at least one embodiment, the connection relationship can be verified by the mobile device 200. When the connection relationship requires verification, the messaging module 102 can send a verification message to the mobile device 200 through the selected messaging method according to the unique identification information. After the connection relationship is verified, the connection relationship can be saved.

The plurality of modules of the mobile device 200 can include a message receiving module 201, a message analyzing module 202, and a coupling module 203. The modules 201-203 can include one or more software programs in the form of computerized codes stored in the second storage unit 220. The computerized codes can include instructions executed by the second processing unit 230 to provide functions for the modules 201-203.

The message receiving module 201 can receive the invitation through the second communication module 210. The message analyzing module 202 can verify that the message was transmitted by the host computer 100 and accept the invitation, and determine a coupling mechanism from the invitation for coupling the mobile device 200 to the host computer 100. The coupling module 203 can couple the mobile device 200 to the host computer 100 through the determined coupling mechanism. In at least one embodiment, the coupling mechanism can be BLUETOOTH. In another embodiment, the coupling mechanism can be WIFI DIRECT or any other suitable coupling mechanism for coupling the mobile device 200 to the host computer 100.

Figure 3:
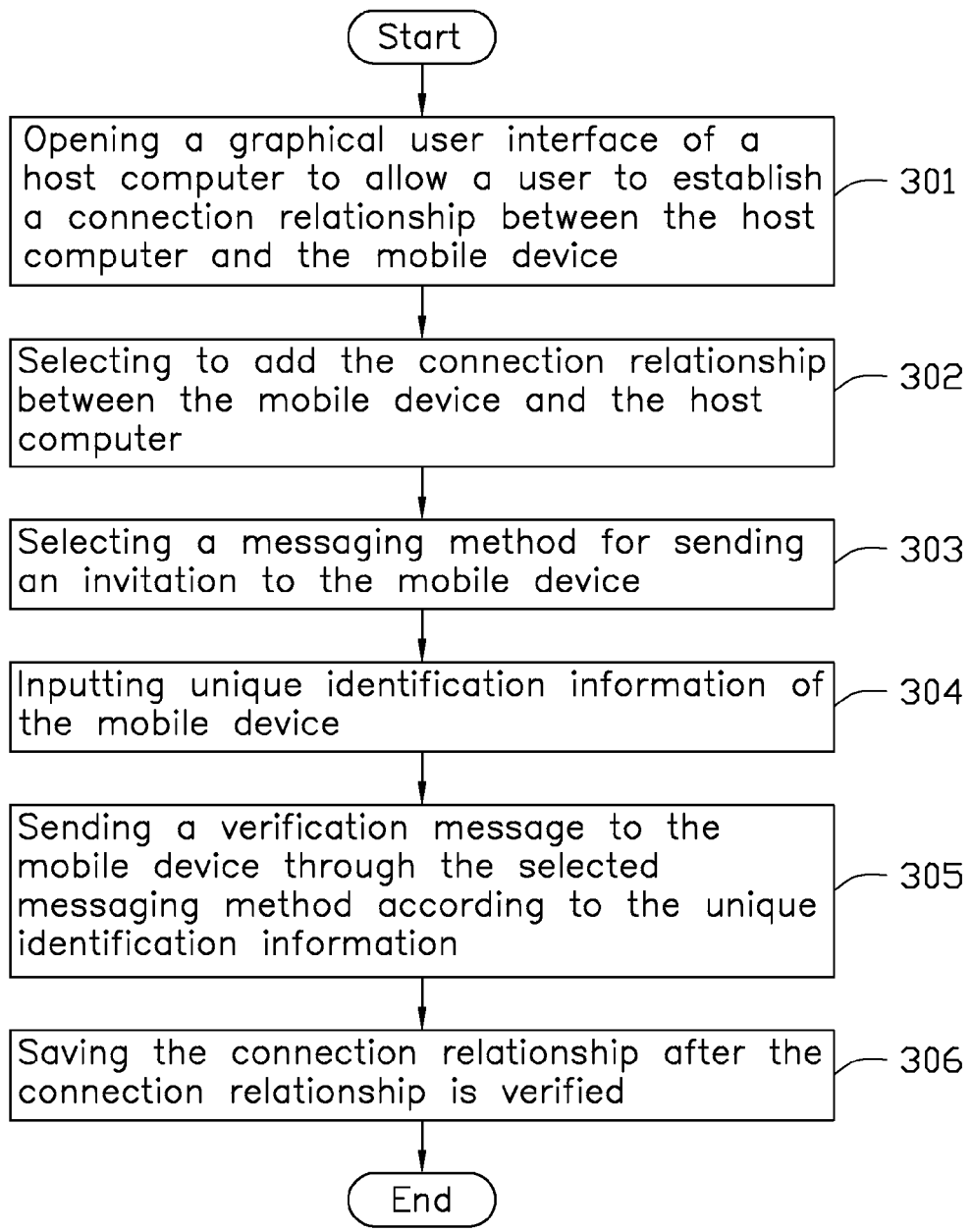
FIG. 3 is a flowchart of an exemplary embodiment of a method for establishing a connection relationship between a host computer and a mobile device.

FIG. 3 illustrates a flowchart of an exemplary embodiment of a method for establishing a connection relationship between a host computer of a vehicle and a mobile device. The example method is provided by way of example, as there are a variety of ways to carry out the method. The method described below can be carried out using the configurations illustrated in FIG. 1 and FIG. 2, for example, and various elements of these figures are referenced in explaining the example method. Each block shown in FIG. 3 represents one or more processes, methods, or subroutines carried out in the example method. Additionally, the illustrated order of blocks is by example only, and the order of the blocks can be changed. The example method can begin at block 301.

At block 301, a graphical user interface of the host computer is opened to allow a user to establish the connection relationship between the host computer and the mobile device.

At block 302, an option to add the connection relationship between the mobile device and the host computer is selected.

At block 303, a messaging method for sending an invitation to the mobile device is selected. The messaging method can include an SMS messaging method, a cellular data messaging method, or any other suitable messaging method.

At block 304, unique identification information of the mobile device is inputted. When the messaging method is the SMS messaging method, the unique identification information can be an SMS number of the mobile device. When the messaging method is the cellular data messaging method, the unique identification information can be a user ID of an application used by the user of the mobile device.

At block 305, the host computer can send a verification message to the mobile device through the selected messaging method according to the unique identification information.

At block 306, the connection relationship can be saved after the connection relationship is verified.

Figure 4:
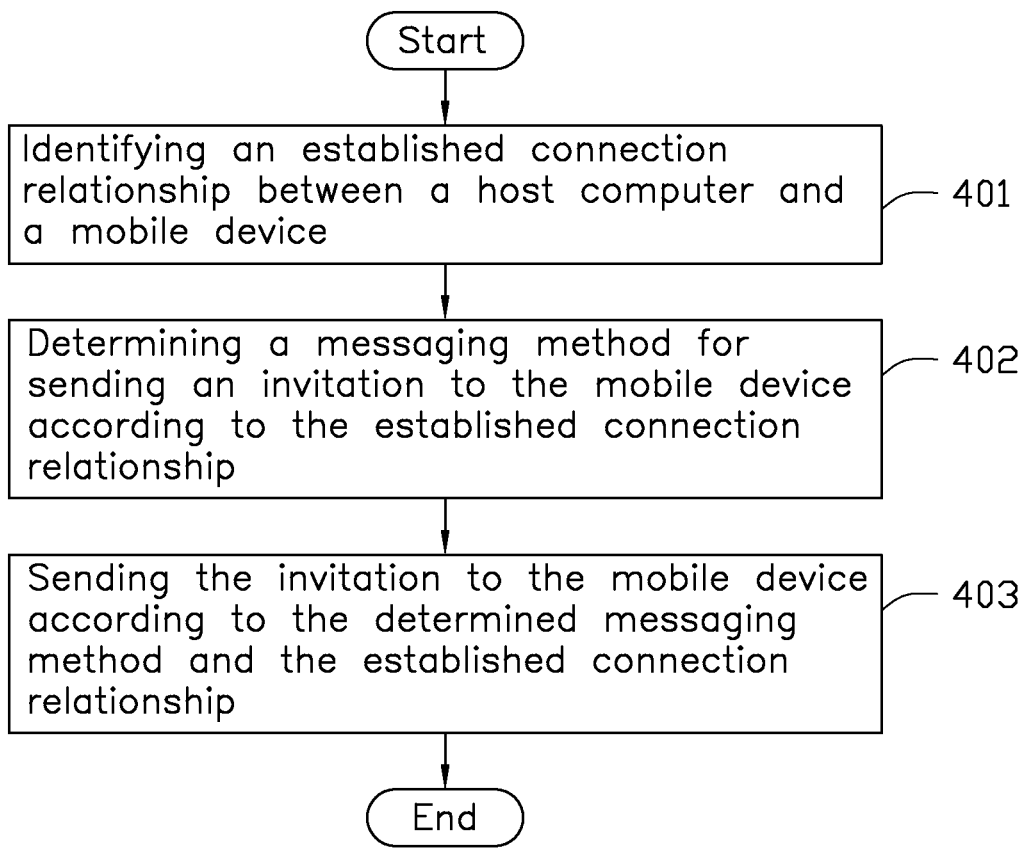
FIG. 4 is a flowchart of an exemplary embodiment of a method for sending an invitation to a mobile device to couple to a host computer.

FIG. 4 illustrates a flowchart of an exemplary embodiment of a method for sending an invitation to a mobile device for coupling the mobile device to a host computer of a vehicle. The example method is provided by way of example, as there are a variety of ways to carry out the method. The method described below can be carried out using the configurations illustrated in FIG. 1 and FIG. 2, for example, and various elements of these figures are referenced in explaining the example method. Each block shown in FIG. 4 represents one or more processes, methods, or subroutines carried out in the example method. Additionally, the illustrated order of blocks is by example only, and the order of the blocks can be changed. The example method can begin at block 401.

At block 401, the host computer can identify an established connection relationship between the host computer and the mobile device. In at least one embodiment, the host computer can identify the established connection relationship automatically after being turned on.

At block 402, the host computer can determine a messaging method for sending the invitation to the mobile device according to the established connection relationship. The messaging method can include an SMS messaging method, a cellular data messaging method, and any other suitable messaging method.

At block 403, the host computer can send the invitation to the mobile device according to the determined messaging method and the established connection relationship.

Figure 5:
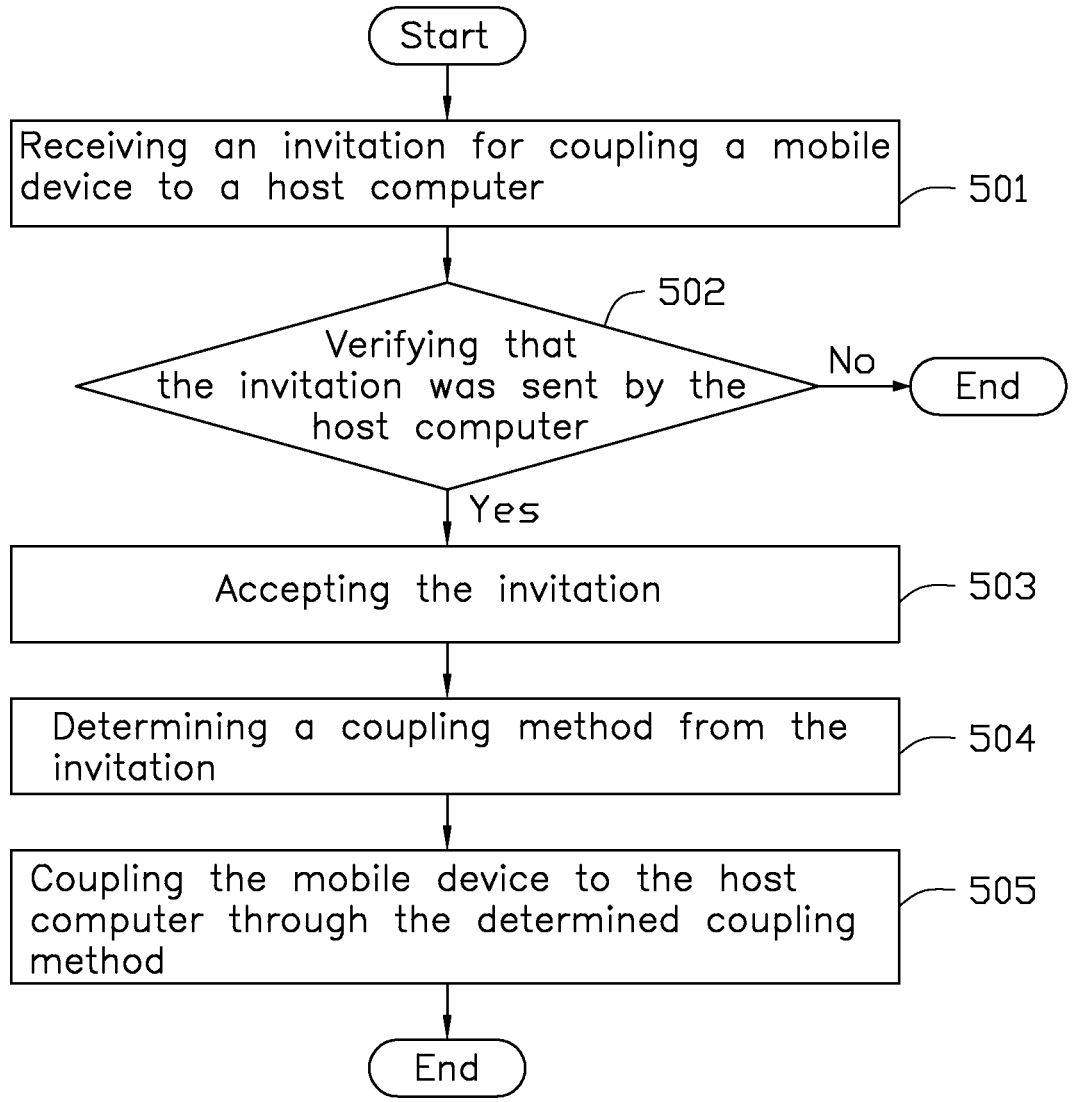
FIG. 5 is a flowchart of an exemplary embodiment of a method for coupling a mobile device to a host computer.

FIG. 5 illustrates a flowchart of an exemplary embodiment of a method for coupling a mobile device to a host computer of a vehicle. The example method is provided by way of example, as there are a variety of ways to carry out the method. The method described below can be carried out using the configurations illustrated in FIG. 1 and FIG. 2, for example, and various elements of these figures are referenced in explaining the example method. Each block shown in FIG. 5 represents one or more processes, methods, or subroutines carried out in the example method. Additionally, the illustrated order of blocks is by example only, and the order of the blocks can be changed. The example method can begin at block 501.

At block 501, the mobile device can receive an invitation for coupling to the host computer sent by the host computer.

At block 502, the mobile device can verify that the invitation was sent by the host computer. If the mobile device determines that the invitation was not sent by the host computer, the method ends. Otherwise, when the mobile device determines that the invitation was sent by the host computer, block 503 is implemented.

At block 503, the mobile device can accept the invitation.

At block 504, the mobile device can determine a coupling method from the invitation. The coupling method can include BLUETOOTH, WIFI DIRECT, or any other suitable coupling method.

At block 505, the mobile device can be coupled to the host computer through the determined coupling method.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for coupling a mobile device with a host computer of a vehicle comprising:
    establishing a connection relationship between the mobile device and the host computer;
    sending an invitation to the mobile device according to the connection relationship; and coupling the mobile device to the host computer after the mobile device accepts the invitation; wherein the invitation is sent by the host computer automatically when the host computer is turned on;

wherein the invitation is sent to the mobile device by: turning on the host computer and identifying the established connection relationship; determining a messaging method for sending the invitation to the mobile device; and sending the invitation to the mobile device according to the determined messaging method; wherein the messaging method comprises an SMS messaging method and a cellular data messaging method.

2. The method as in claim 1, wherein the connection relationship between the mobile device and the host computer is established by:

opening a graphical user interface of the host computer to allow a user to add the connection relationship;

selecting to add the connection relationship between the mobile device and the host computer;

selecting a messaging method; and inputting unique identification information of the mobile device.

3. The method as in claim 2, wherein the messaging method comprises an SMS messaging method and a cellular data messaging method; when the messaging method is the SMS messaging method, the unique identification information comprises an SMS number of the mobile device; when the messaging method is the cellular data messaging method, the unique identification information comprises a user ID for an application used by a user of the mobile device.

4. The method as in claim 2 further comprising:

sending a verification message to the mobile device through the selected messaging method according to the unique identification information;

verifying the connection relationship; and saving the connection relationship after the connection relationship is verified.

5. The method as in claim 1, wherein the mobile device is coupled to the host computer by:

receiving the invitation sent by the host computer;

verifying that the message was sent by the host computer; accepting the invitation;

determining a coupling method from the invitation; and coupling the mobile device to the host computer through the determined coupling method.

6. The method as in claim 5, wherein the coupling method comprises BLUETOOTH and WIFI DIRECT.

7. A system for coupling a mobile device to a host computer of an automobile;

wherein the host computer comprises:

a first display configured to display a graphical user interface operable by a user thereon;

a first communication unit configured to send an invitation to the mobile device;

a first processing unit configured to execute a plurality of instructions of a plurality of modules of the host computer; and a first storage device configured to store the plurality of instructions of the plurality of modules of the host computer, the plurality of modules comprising:

a setting module configured to establish a connection relationship between the host computer and the mobile device in response to a user's input on the graphical user interface; and a messaging module configured to identify the established connection relationship between the host computer and the mobile device, determine a messaging method for sending the invitation to the mobile device according to the established connection relationship, and send the invitation to the mobile device through the first communication unit according to the determined messaging method; and the mobile device comprises:

a second display configured to display a graphical user interface operable by the user thereon;

a second communication unit configured to receive the invitation sent from the host computer;

a second processing unit configured to execute a plurality of instructions of a plurality of modules of the mobile device; and a second storage device configured to store the plurality of instructions of the plurality of modules of the mobile device, the plurality of modules comprising:

a message receiving module configured to receive the invitation transmitted from the first communication unit of the host computer to the second communication unit of the mobile device;

a message analyzing module configured to verify that the invitation was sent by the host computer, accept the invitation, and determine a coupling mechanism from the invitation for coupling the mobile device to the host computer; and a coupling module configured to couple the mobile device to the host computer through the determined coupling mechanism.

8. The system as in claim 7, wherein the host computer both identifies the connection relationship with the mobile device and sends the invitation to the mobile device automatically after being turned on.

9. The system as in claim 7, wherein the messaging method of the first communication unit sending the invitation to the second communication unit comprises an SMS messaging method and a cellular data messaging method.

10. The system as in claim 7, wherein the coupling mechanism comprises BLUETOOTH and WIFI DIRECT.

* * * * *